United States Patent
Baker et al.

(10) Patent No.: US 6,271,319 B1
(45) Date of Patent: Aug. 7, 2001

(54) MEMBRANE-AUGMENTED POLYPROPYLENE MANUFACTURING

(75) Inventors: Richard W. Baker; Andre R. Da Costa, both of Palo Alto; Ramin Daniels, San Jose; Ingo Pinnau, Palo Alto; Zhenjie He, Fremont, all of CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 09/651,300

(22) Filed: Aug. 30, 2000

(51) Int. Cl.$^7$ .................................................. C08F 2/04
(52) U.S. Cl. .................................... 526/68; 520/77
(58) Field of Search ..................................... 526/68, 77

(56) References Cited

U.S. PATENT DOCUMENTS

| | | | |
|---|---|---|---|
| 3,758,603 | 9/1973 | Steiglemann et al. | 260/677 A |
| 4,235,983 | * 11/1980 | Steigelmann et al. | 526/68 |
| 4,623,704 | 11/1986 | Dembicki et al. | 526/68 |
| 4,910,276 | 3/1990 | Nakamura et al. | 526/247 |
| 5,670,051 | 9/1997 | Pinnau et al. | 210/651 |
| 5,710,345 | 1/1998 | Navarrini et al. | 568/596 |
| 5,769,927 | 6/1998 | Gottschlich et al. | 95/39 |

OTHER PUBLICATIONS

C. Staudt–Bickel et al., "Olefin/parafin gas separations with 6FDA–based polyimide membranes", J. Membrane Science 170, 205–214, 2000.*

"Propylene/Propane Separation", Carbon Membranes, Ltd. Product Information.

C. Staudt–Bickel et al., "Olefin/paraffin gas separations with 6FDA–based polyimide membranes", J. Membrane Science 170, 205–214, 2000.

S. Ando et al., "Perfluorinated polymers for Optical Waveguides", Chemtech, p. 20–27, Dec. 1994.

R. Hughes et al., "Olefin Separation by Facilitated Transport Membranes", in *Recent Developments in Separation Science*, N. Li et al. (eds)., CRC Press, Boca Raton, FL. (1986).

* cited by examiner

Primary Examiner—David W. Wu
Assistant Examiner—William Cheung
(74) Attorney, Agent, or Firm—J. Farrant

(57) ABSTRACT

A process for polypropylene manufacturing, including treating a vent stream from the polymerization reactor, to recover propylene for return to the reactor. The process involves using a gas separation membrane to separate propylene from propane in the reactor vent stream. The membrane separation step results in a residue stream typically containing as much as 30% propane or more, which is vented from the polymerization process, and a permeate stream containing 95% or less propylene, which is recirculated to the polymerization reactor.

33 Claims, 5 Drawing Sheets

MEMBRANE-AUGMENTED POLYPROPYLENE MANUFACTURING

This invention was made in part with Government support under SBIR award number 68D70013 awarded by the Environmental Protection Agency. The Government has certain rights in this invention.

FIELD OF THE INVENTION

The invention concerns polypropylene manufacturing. More specifically, the invention concerns the selective purging of propane and recovery of propylene in the process by using gas separation membranes to treat the reactor vent stream.

BACKGROUND OF THE INVENTION

The United States produces more than 10 billion pounds of polypropylene annually. In a typical polymerization process, propylene monomer, catalysts and other agents are introduced into a high-pressure reactor. The raw effluent from the reactor is transferred continuously to a flash tank, from which a stream of raw polymer is withdrawn for further purification. A stream of overhead gases, containing unreacted monomer, is also withdrawn from the flash tank and is recirculated to the reactor. Thus, the propylene feed to the reactor is a combination of fresh propylene and propylene recirculated in the reactor/flash process loop. The fresh feed is usually polymer-grade propylene, a high-purity reagent that has a propylene content of 99+%, the remaining 1% or less being mostly propane, which passes unchanged through the reactor. Although the proportion of inert gas introduced into the reactor loop with the fresh feed in this way is small, the amount circulating builds up quickly, reducing the catalyst activity and reactor productivity. Propane build-up is usually controlled to a steady-state propane content in the loop in the range about 5–30%, by continuously venting a small fraction of the overhead gas from the recirculation loop.

Such a purge operation is unselective however, and, since the vent stream may contain as much as 90 vol % or more of propylene, multiple volumes of propylene may be lost from the loop for every volume of propane that is purged. Even though the volume of gas vented is only a few percent of the volume of fresh feed, the propylene lost in this way may typically amount to about 5 million lb per polymerization plant per year, which, at 20 cents per pound, has a value of $1 million.

Despite its high value, propylene recovery from the purge stream by separating it from the propane before the propane is vented is generally not cost effective. Separation of propylene from propane is difficult, because of the similar physical properties, including close boiling points (propylene, −48° C. and propane −42.2° C.). When high-purity polymer grade propylene is manufactured, it is separated from propane in a $C_3$ splitter, a large cryogenic distillation column that typically contains 150 or more trays. It is clearly not practical or economic to install such equipment solely for purge treatment. Pressure swing adsorption (PSA), which can make product streams of high purity, has also been considered, but available adsorbents are not very effective, and PSA systems are also costly and energy intensive.

In summary, without the ability to recover propylene from the purge gas, there is an inevitable trade-off between controlling propane concentration in the reactor and losing propylene feedstock in the purge vent stream, by which operators of polypropylene plants are constrained. By purging a chosen percentage of the effluent light overhead gas, the operator makes what is for him, in the circumstances specific to the plant, the most acceptable compromise between the two undesirable extremes of excessive propylene loss and excessive loss of reactor efficiency.

Separation of propylene from propane by means of membranes is discussed extensively in the literature. It is well known that numerous materials and membranes exist with intrinsic selectivity for propylene over propane. These include facilitated transport membranes, polymeric membranes and inorganic membranes.

Membranes are not immediately attractive, however, for propylene recovery from vent gas, because, unlike PSA and cryogenic distillation, membranes are not able to produce a high-purity propylene permeate stream and at the same time achieve high levels of propylene recovery. The reason for this is that a membrane is not a perfectly selective barrier. If the membrane area and time in which the molecules of the gas stream are in contact with the membrane surface are very small, only a very small cut of the total feed flow will permeate. Since propylene permeates faster than propane, most of this small permeate cut will be propylene. That is, the permeate stream will have high propylene purity, and the residue stream will have a composition that is not much changed from the membrane feed composition. In other words, most of the propylene that was present in the feed gas will remain on the feed side, and will be lost when that gas is vented. Propylene recovery can be increased by increasing membrane area and contact time for the gas molecules. However, in this case propane permeation will also be increased. In other words, increasing propylene recovery also results in increasing propane recovery. Thus, little propylene will remain on the feed side to be lost by venting, but the recovered gas will be of low propylene purity.

Despite this inherent difficulty, it has been proposed to apply membrane separation to the recovery of olefins from polymerization reactor vents. U.S. Pat. No. 4,623,704 describes such a process for recovering ethylene from the reactor vent of a polyethylene plant. In this case of polyethylene manufacturing, the reactor is run at very high ethylene, very low ethane levels, so that the vent stream contains 96.5% ethylene, only 2.7% ethane and smaller amounts of methane and nitrogen. The stream is passed across a cellulose triacetate membrane that is selective for ethylene over ethane. Although the membrane selectivity is poor, the membrane produces an upgraded permeate stream, now containing 97.9% ethylene and 1.5% ethane, which is considered sufficiently free of impurities for return to the reactor, and a residue stream containing 89.9% ethylene, 8.5% ethane, which is purged from the reactor loop and used as fuel gas.

A chapter by R. D. Hughes et al., entitled "Olefin Separation by Facilitated Transport Membranes", in *Recent Developments in Separation Science*, N. N. Li et al. (Eds), CRC Press, 1986, discusses pilot-scale tests of a facilitated-transport membrane module at a polypropylene plant. The module was used to treat vent gas from the reactor with a view to recovering propylene. The test was a technical success for the membranes, in that the module was able to produce a permeate stream typically containing about 97–99% propylene. However, since the membrane process could not produce polymer-grade propylene, the permeate was not recirculated to the reactor, and the process was not pursued.

Thus, recovery of propylene from the propane vent stream of polypropylene manufacturing reactors has long been recognized to be desirable. It has also been recognized that the recovered propylene needs to be of comparably high purity to the fresh reactor feedstock if it is to be recirculated in the process. Although methods for separating propylene from a propylene/propane mixture exist, they are impractical for vent stream treatment, either because they are too costly, or because they cannot produce sufficiently pure polymer-grade propylene.

SUMMARY OF THE INVENTION

The invention is an improved process for making polypropylene. The process involves polymerizing propylene to polypropylene in a reactor, separating the polypropylene product from the reactor effluent, and recirculating unreacted propylene to the reactor. The process includes a membrane separation step to provide selective purging of propane and other inert components from the polymerization reactor loop, and to recover a propylene-enriched stream for return to the reactor.

The process differs from previous polypropylene manufacturing processes in that the trade-off between propylene loss and reactor propane concentration is shifted, so that, compared with the prior art, both propylene loss and reactor propane level can be improved simultaneously.

In its most basic aspect, the process of the invention comprises the following steps:

(a) polymerizing propylene in a polymerization reactor;

(b) withdrawing from the reactor an effluent comprising polypropylene, propylene and propane;

(c) subjecting the effluent to at least one separation step, thereby producing a raw polymer stream and a gas stream;

(d) passing at least a portion of the gas stream across a feed side of a membrane selective for propylene over propane;

(e) withdrawing from a permeate side of the polymeric membrane a permeate stream enriched in propylene compared to the gas stream;

(f) withdrawing from the feed side a residue stream enriched in propane compared to the gas stream;

(g) recirculating at least a portion of the permeate stream as feed to the polymerization reactor; the process being characterized in that the permeate stream has a propylene concentration that is lower than 95%.

The polymerization and separation steps (a) through (c) are carried out as generally taught in the prior art. The polymerization itself may take place in the gas phase or the liquid phase, using such reagents, catalysts, solvents and other additives as are known and available.

The separation step that creates the crude polymer product stream and the propylene-containing gas stream may be carried out in any convenient manner, such as by flashing, cooling/condensation, distillation, absorption or combinations of these, depending on whether the effluent from the polymerization reactor is in the liquid phase or the gas phase, and on what other components are present.

The membrane separation steps (d) through (f) may be carried out on the entirety of the stream to be recirculated to the reactor, but generally are performed only on a minor part of the stream, with the major portion of the stream being recirculated directly to the reactor. The membrane separation steps may take the form of a single membrane separation operation or of multiple sub-operations, depending on the feed composition, membrane properties and desired results.

The membrane feed stream typically contains more than 5% propane and less than 95% propylene. The membrane separation steps produce a residue stream with a relatively high concentration of propane, such as as much as 30%, 40% or more, which is vented from the reactor loop. In this way, the amount of propylene vented from the process is reduced, compared with prior art unselective purging. Typically, the amount of propylene lost with the vented propane may be reduced from, for example, four volumes of propylene per volume of propane to one or two volumes of propylene per volume of propane.

The membrane separation steps also produce a permeate stream enriched in propylene compared with the membrane feed stream, at least a portion of which is recirculated directly or indirectly to the reactor. This gas has a much lower concentration of propylene than polymer-grade. In fact, the membrane permeate stream typically has a propylene concentration that is below 95%, a or even below 90%, and is recirculated to the polymerization reactor at comparatively low concentration. That is, contrary to the teachings and beliefs of the prior art, the recovered propylene stream that is recirculated to the reactor is not of the high-purity previously thought to be necessary for the recovered stream.

As mentioned, the membrane permeate stream usually comprises only part of the recirculated gas, the other part being gas that is recirculated directly in the loop without passing through membrane treatment. However, the propylene content of the recirculated membrane permeate stream, although below polymer-grade, is increased compared with the untreated gas. Therefore, when the present process is compared with prior art processes, in which none of the recirculated gas has been treated by membrane separation, the recirculated gas has a slightly higher propylene concentration than in the prior art case. Thus, the process can provide a slightly higher propylene partial pressure and correspondingly lower propane partial pressure in the reactor than was achieved previously. This is beneficial in increasing catalyst life and efficient use of reactor capacity.

Additional separation steps may be carried out in the loop as desired to supplement the polymer separation or membrane separation steps or to remove secondary components from the stream.

In another aspect, the invention is reactor apparatus comprising a reactor loop incorporating the reactor itself, the polymer separation equipment and the membrane separation unit containing a propylene-selective membrane.

It is to be understood that the above summary and the following detailed description are intended to explain and illustrate the invention without restricting its scope.

DETAILED DESCRIPTION OF THE INVENTION

The terms gas and vapor are used interchangeably herein.

The term $C_{2+}$ hydrocarbon means a hydrocarbon having at least two carbon atoms; the term $C_{3+}$ hydrocarbon means a hydrocarbon having at least three carbon atoms; and so on.

The term polypropylene as used herein includes homopolymers of propylene, propylene copolymers (for example with ethylene or butylene), and propylene terpolymers, in both unsubstituted and substituted (such as halogenated) forms.

The invention is an improved process for making polypropylene. The process provides selective purging of propane from the polymerization reactor loop. By a reactor loop, we mean a configuration in which at least a part of the effluent stream from the polymerization reactor is recirculated directly or indirectly to the reactor. The process can be applied to any propylene polymerization loop in which propylene is fed to the reactor, and in which propylene and propane are present in the effluent from the reactor. The primary goals of the process are to remove propane from the reactor loop while controlling loss of propylene, and to return the recovered propylene as feed to the reactor.

Figure 1:
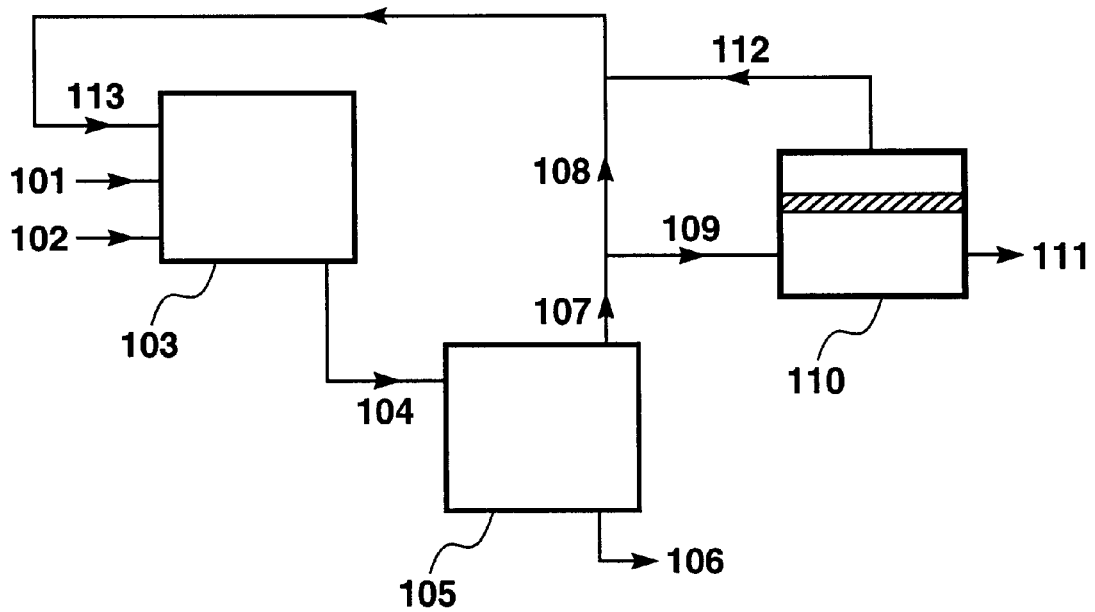
FIG. 1 is a schematic drawing showing a basic embodiment of the invention.

The invention in a basic representative embodiment is shown schematically in FIG. 1. Referring to this figure, box 103 represents the polymerization reactor. FIG. 1 shows three feed streams entering the reactor. Stream 101 is the fresh propylene stream. This is typically, but not necessarily, polymer-grade propylene with a propylene content of 99% or above, such as 99.5%. Stream 102 represents catalysts, stabilizers, inhibitors, solvents or other components that may be introduced into the reactor as required, depending upon the specific polymerization technique being used. Stream 113 is the stream of recirculated propylene. Commonly, these streams are passed through compressors and heat exchangers (not shown for simplicity) to bring them to the appropriate reaction conditions before entering the reactors. The streams can be prepared and fed separately to the reactor, or can be combined before entering the reactor.

One or multiple reactors may be involved in the process, with the individual reactors carrying out the same or different unit operations. The product manufactured may be any type of propylene polymer, including, but not limited to, homopolymers, such as a medium- or high-impact homopolymers; substituted, including halogenated, homopolymers; copolymers, such as random and block copolymers of ethylene and propylene; and terpolymers.

Propylene polymerization may be carried out in the liquid phase or the gas phase. Suitable catalysts are titanium chlorides and/or alkylaluminum chlorides.

The gas-phase process is usually performed at high pressure, such as 400–500 psig, and at a temperature of about 70–90° C. In the gas-phase process, propylene is introduced to the reactor as a liquid. Within the reactor the propylene is allowed to evaporate to keep the reaction temperature at a suitably low level. The polymer is formed as a powder entrained with the propylene gas, and is separated from the gas by one or more cyclone separators at the top of the reactor vessel. The unreacted propylene, propane and any other light contaminants are withdrawn from the reactor, cooled in a heat exchanger and liquefied and recirculated.

In the liquid-phase process, propylene, catalyst and a solvent, such as hexane, are introduced to the reactor, which is operated again at high pressure, such as 75–450 psig, and modest temperature, such as about 70° C. In this case, the polymer forms as particles suspended in the solvent, and the resulting slurry is withdrawn and separated for polymer purification and monomer recycle.

It will be apparent to those of skill in the art that the above are general descriptions of preferred polymerization reaction techniques that are well known. More information about these and other specific arrangements is available in petrochemical engineering reference books, for example, *Handbook of Petrochemicals and Processes*, G. M. Wells, Gower Publishing, 1995. It will further be apparent that the reactor operating conditions and functioning are not critical to the invention and can and will vary from plant to plant. Thus, the scope of the invention embraces all propylene polymerization reactor types and operating conditions consistent with producing apropylene/propane purge stream amenable to membrane separation treatment as set forth below.

The effluent stream, 104, is withdrawn from the reactor. Depending upon the conditions in the reactor and/or the exit conditions, this stream may be in the form of gas or liquid. Stream 104 is introduced into a separation step, or frequently, a train of separation steps, indicated simply as box 105 in FIG. 1. The purpose of this step or steps is to separate the effluent into at least a stream, 106, containing the crude polymer, and a stream, 107 containing unreacted monomer for recirculation.

Techniques that may be used to treat the reactor effluent include flashing, cooling/condensation, distillation, absorption or combinations of these, depending on whether the effluent from the polymerization reactor is in the liquid phase or the gas phase, and on what other components are present. Physical phase separation, of powder or particle streams from gas streams, or of liquid streams from gas streams, can be carried out in simple gravity separators, cyclone separators or any other convenient type. All of these techniques and pieces of equipment are familiar and readily available.

As a representative, but non-limiting example, if the effluent is in the liquid phase, the liquid can be passed first to one or more flash steps. Typically, flashing is achieved by letting down the pressure on the liquid, thereby achieving essentially instantaneous conversion of a portion of the liquid to the gas phase. This may be done by passing the liquid through an expansion valve into a receiving tank or chamber, or any other type of phase separation vessel, for example. The released gas can be drawn off from the upper part of the chamber; the remaining liquid can be withdrawn from the bottom. Flashing may be carried out in a single stage, but is preferably done in two or more stages at progressively lower pressures. The polymer-containing fraction is withdrawn from the bottom of the flash tank and is sent for polymer purification and finishing as is known in the art. As mentioned above, in liquid-phase processes the reactor effluent includes hexane and it may also contain hydrogen, added as an inert diluent to control polymerization, so, in this case, the flash overhead stream is a mix of propylene, propane, hexane, hydrogen and small quantities of other light hydrocarbons and agents that may have been added to facilitate polymerization. This stream can be reliquefied and then distilled to split the hexane and other $C_{4+}$ hydrocarbons, as a bottom stream, from the propylene, propane and other light components, as an overhead stream. This overhead stream then forms stream 107.

As a second representative, but non-limiting example, if the polymerization takes place in the gas phase, the reaction effluent is a mixture of polymer powder and propylene and other gases. This mixture is separated by passing through a tube inside the reactor itself to one or more cyclone separators. The powder phase is removed for finishing. The unreacted propylene, propane and any other light contaminants are withdrawn as a gas phase from the reactor, and form stream 107. Since the reactor feed is liquid in this case, the recirculation stream must be cooled and condensed back to liquid form before it is returned to the reactor inlet.

When the separation steps are complete, the crude polymer stream, 106 is withdrawn as shown. Thereafter, this stream is typically subjected to purging with nitrogen, to remove propylene remaining in the polymer, and sent for further finishing as required.

Stream 107 is split into two streams, 108 and 109. Stream 108 is reliquefied, if need be, and recirculated in the reactor loop as shown; stream 109 is removed from the reactor loop and passes as feed to the membrane separation step.

If a conventional prior art process without membrane treatment of the vent gas were to be performed, the amount of gas purged from the loop in stream 109 (and then vented in total) would reflect the level of propane removal necessary to maintain the reactor propane concentration at a certain value. For example, if the fresh propylene feed is polymer grade, containing 0.5% propane, then 1 lb/h of propane enters the reactor for every 200 lb/h of feed. If the propane concentration in the recirculating gas is 25%, then to vent 1 lb/h of propane, corresponding to the incoming propane, means that the total purge stream flow rate is 4 lb/h. If conversion per reactor pass is about 50%, then stream 107 also has a flow rate of about 200 lb/h, so stream 107 would be split, so that about 4 lb/h of gas is vented as stream 109 and the remainder is returned within the process as stream 108. Thus, stream 109 would represent about 2% of stream 107.

In the process of the invention, there is more flexibility in the amount of gas removed in stream 109, as will become clear from the discussion of the membrane separation step and from the examples presented below. However, it will still normally be the case that stream 109 is relatively small compared with stream 107 and preferably stream 109 is no more than about 10% of stream 108.

Stream 109 passes as feed stream to membrane unit 110. The membrane unit contains a membrane that exhibits a substantially higher permeability for propylene than for propane. Over time, a variety of membrane types and materials have been reported in the literature with apparently useful properties for propylene/propane separation. One group of membranes that has been extensively studied for thirty years is facilitated-transport membranes. These contain a liquid that itself contains, for example, free silver ions that reacts selectively and reversibly with unsaturated hydrocarbons, to selectively carry propylene across the membrane. Facilitated-transport membranes with liquid carriers of this type have never reached commercial use for any separation, owing, amongst other problems, to instability under industrial conditions and to the need to saturate the feed gas with water. Such membranes are, therefore, not recommended for use in the invention.

In recent years, membranes that make use of free carrier ions dissolved in a solid polymer solution, rather than an aqueous solution, have been developed. These membrane are taught in U.S. Pat. No. 5,670,051. The membranes remain mechanically stable up to feed pressures of at least 500 psig and can work with dry feed gases. Such membranes are not yet available commercially but can be manufactured according to the teachings of that patent and are suitable for use in the claimed process.

Yet other membranes with propylene/propane separating properties are very finely porous inorganic membranes, such as carbon membranes, that act as very fine sieves that separate on the basis of difference in molecular size. Inorganic membranes are characterized by good temperature and chemical resistance. Such membranes are available commercially for propylene/propane separation, such as from Carbon Membranes Ltd., of Arava, Israel, and are reported to provide propylene/propane selectivity of up to 12–15 and propylene flux of 180 GPU under favorable conditions.

The most preferred membranes for use in the invention, however, are polymeric membranes. The permeability of a gas or vapor through a polymer film is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{2+}$ organic molecules. For rubbery or elastomeric polymers, the difference in size is much less critical, because the polymer chains can be flexed, and sorption effects generally dominate the permeability. Elastomeric materials, therefore, tend to permeate large, condensable hydrocarbon molecules faster than small, low-boiling molecules. Thus, most rubbery materials are selective in favor of all $C_{3+}$ hydrocarbons over methane. For propylene/propane separation, both the boiling points (−48° C. propylene, −42.2° C. propane) and the molecular diameters (4.0 Å for propylene, 4.3 Å for propane) are close. Thus, many polymer materials, both rubbery and glassy, have little or no selectivity for propylene over propane. However, some glassy materials are known from published experimental data to have useful separation properties, and these are the preferred materials. Examples of such polymers that can be used to make propylene/propane separating membranes are poly(phenylene oxide) (PPO), and polyimides, particularly 6FDA-based polyimides, where 6FDA is the structure:

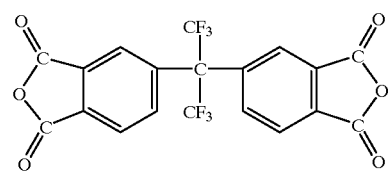

Representative 6FDA polyimides include 6FDA-ODA,

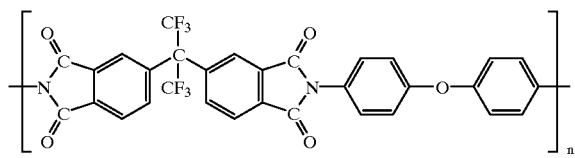

where n is a positive integer;
6FDA-NDA,

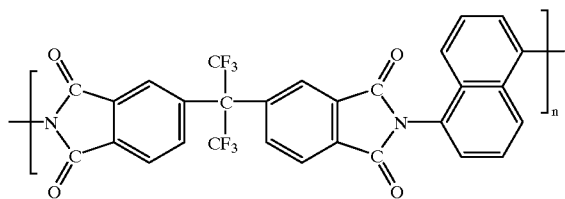

where n is a positive integer;
and 6FDA-TMPD,

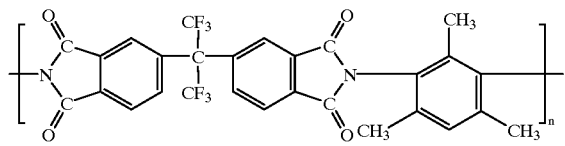

where n is a positive integer;

Between these three, 6FDA-NDA is most preferred because, as shown in the experimental examples, below, we found that composite membranes using this polymer as a selective layer exhibited the best combination of propylene flux and propylene/propane selectivity as measured with propylene/propane gas mixtures. Other 6FDA polyimides that may be used, although they have lower propylene permeability than those listed above, are 6FDA-IPDA,

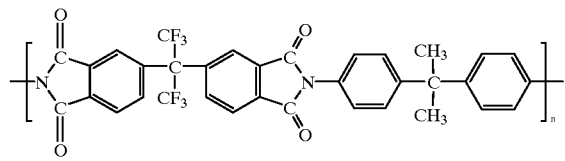

where n is a positive integer;

and 6FDA-FpDA,

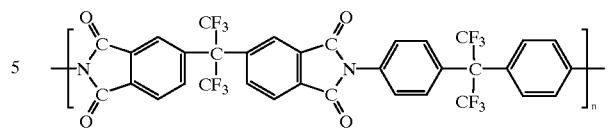

where n is a positive integer.

Permeation data for films and membranes made from these latter two polyimides are reported in C. Staudt-Bickel et al., "Olefin/paraffin gas separations with 6FDA-based polyimide membranes", *Journal of Membrane Science*, Vol. 170, pages 205–214 (2000).

Another polyimide class that is believed to contain usefull selective layer materials is the perfluorinated polyimides. Such materials have been investigated for use as optical waveguides, and their preparation is described, for example, in S. Ando et al., *"Perfluorinated polymers for optical waveguides"*, CHEMTECH, December, 1994. To be usable as membrane materials, the polyimides have to be capable of being formed into continuous films. Thus, polyimides that incorporate ether or other linkages that give some flexibility to the molecular structure are preferred. Particular examples are polymers comprising repeat units prepared from the perfluorinated dianhydride 1,4-bis(3,4-dicarboxytrifluorophenoxy) tetrafluorobenzene (10FEDA), which has the structure:

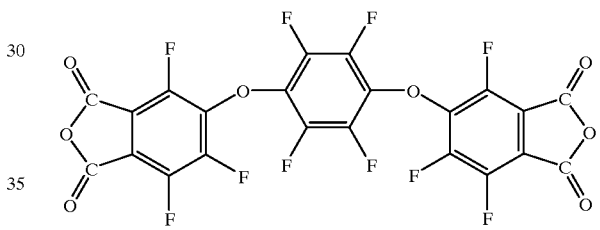

Diamines with which 10FEDA can be reacted to form polyamic acids and hence polyimides include 4FMPD, which has the structure:

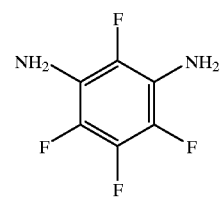

The resulting 10FEDA/4FMPD polyimide has the repeat unit structure:

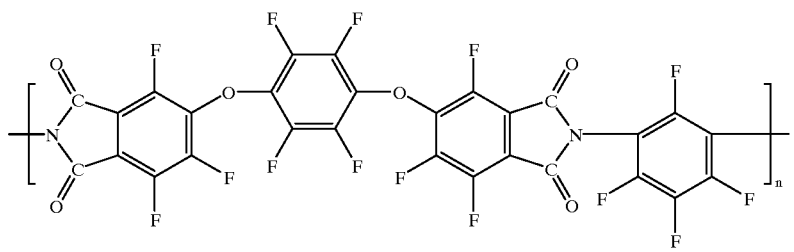

where n is a positive integer.

Yet another group of polymers that includes particularly preferred materials is glassy polymers characterized by having repeating units of a fluorinated, non-aromatic cyclic structure, the ring having at least five members, and further characterized by a fractional free volume no greater than about 0.3. Preferred polymers in this group are formed from fluorinated monomers of (i) dioxoles, which are five-member rings of the form

that polymerize by opening of the double bond, or (ii) dioxolanes, similar five-member rings but without the double bond in the main ring, or (iii) aliphatic structures having an alkyl ether group, polymerizable into cyclic ether repeat units with five or six members in the ring. The polymers may take the form of homopolymers or copolymers. Such materials are discussed at length in copending patent application Ser. No. 09/574,420 entitled "Gas Separation Using Organic-Vapor-Resistant Membranes", which is incorporated herein by reference as it relates to olefin/paraffin separations.

Specific most preferred materials in this group are copolymers of tetrafluoroethylene with 2,2,4-trifluoro-5-trifluoromethoxy-1,3-dioxole having the structure:

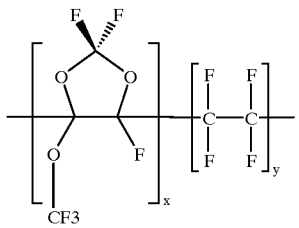

where x and y represent the relative proportions of the dioxole and the tetrafluoroethylene blocks, such that x+y=1.

Such materials are available commercially from Ausimont S.p.A., of Milan, Italy under the trade name Hyflon® AD. Different grades are available varying in proportions of the dioxole and tetrafluoroethylene units.

A second highly preferred material of this type has the structure:

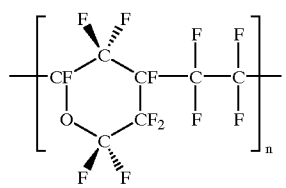

where n is a positive integer.

This material is available commercially from Asahi Glass Company, of Tokyo, Japan under the trade name Cytop®.

Because all of these preferred polymers are glassy and rigid, an unsupported film of the polymer is usable in principle as a single-layer gas separation membrane. However, such layers are normally far too thick to yield acceptable transmembrane flux, and preferably, the separation membrane comprises a very thin selective layer that forms part of a thicker structure, such as an asymmetric membrane or a composite membrane. The thin skin or coating layer is responsible for the separation properties and the underlying integral or discrete microporous support layer is responsible for mechanical strength. Additional layers can be added if desired, such as to seal the support layer before the selective layer is applied, to protect the surface from abrasion, and so on. The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

Since conventional polymeric materials are used for the membranes, they are relatively easy and inexpensive to prepare and to house in modules, compared with other types of membranes that might be used, such as pyrolysed carbon membranes and ceramic membranes.

To achieve a high flux of the preferentially permeating propylene, the selective layer responsible for the separation properties should be thin, preferably, but not necessarily, no thicker than 10 $\mu$m, and typically no thicker than 5 $\mu$m. It is preferred that the selective layer be sufficiently thin that the membrane provide a pressure-normalized propylene flux, as measured with pure propylene at 25° C., of at least about 10 GPU (where 1 GPU=1×10$^{-6}$ cm$^3$(STP)/cm$^2$·s·cmHg), and more preferably at least about 20 GPU.

The propylene/propane selectivity that can be obtained from most membranes under real operating conditions is small. Although literature references cite propylene/propane selectivities even as high as 50 or more, these data have generally been obtained from experiments with pure gases under low feed pressure conditions and with a vacuum on the permeate side. With gas mixtures at high feed pressures, the best propylene/propane selectivity that can be obtained is typically no higher than between 2 and 3. However, as shown in the Examples section below, and contrary to what has generally been believed to be the case by those of skill in the art, useful processes are possible even with low propylene/propane selectivity. Thus the propylene/propane selectivity of the membranes when in use in the process is preferably at least about 2, and more preferably at least about 3. Higher selectivity membranes, if they are available, may be used but are not required.

A driving force for transmembrane permeation is provided by a pressure difference between the feed and permeate sides of the membrane. If the overhead gas after the crude polymer separation steps remains at high pressure, such as above 100 psig, then this is usually adequate to carry out the membrane separation step without additional compression. If stream 107 has been let down to low pressure, such as atmospheric or close to atmospheric, then compression, preferably to 100 psig or above, is needed to drive the membrane separation step. However, in that case, stream 108 also requires recompression before it can be returned to the reactor, so it is often possible to use one compressor for both purposes. Alternatively, if the pressure of stream 109 is inadequate for whatever reason, a compressor may be included in the line upstream of the membrane unit to specifically boost the membrane feed stream pressure as appropriate.

The membrane separation step divides the purge stream 109 into a residue stream, 111, enriched in propane and depleted in propylene, and a permeate stream, 112, enriched in propylene and depleted in propane. The residue stream is vented and the permeate stream, after recompression as necessary (not shown in the figure) is recirculated to the reactor, either as a separate stream or in combination with stream 108 as indicated by stream 113.

The selective purging capability thus provided by the membrane separation step can be used to advantage in several ways. In one aspect, the relative masses of propane and propylene vented from the reactor recycle loop can be controlled. Suppose reactor conditions and flow rates are such that it is necessary, by whatever means, to remove 250 lb/h of propane from the reactor loop. Without the membrane separation step, this level of removal might result, for example, in the purging and loss of 750 lb/h of propylene. By including the membrane separation step and venting the residue stream, a flow of 250 lb/h of propane can be removed, for example, by purging only 250 lb/h of propylene. This has the immediate benefit of cutting the propylene loss to one-third of what it would be if unselective purging were practiced. Yet the reduction in propylene loss is not traded for a worsening of reactor operating conditions, since the amount of propane purged from the loop remains as high as it was before.

The flexibility to do this also differs from the prior art teachings that considered using a membrane separation step. In these teachings, discussed in the Background section above, the objective was to provide a high-purity propylene permeate stream into which relatively little propane had leaked. As explained above, this means that the residue stream composition, that is, the vented stream composition, is little changed from the membrane feed stream composition. In the present process, however, there is no attempt to make a permeate stream of very high propylene purity. Thus, the loss of propylene with the vented propane can be reduced by operating the membrane separation step at high enough stage-cut to change the proportions of propane and propylene in the residue stream significantly, as compared with the membrane feed stream. By significantly, we mean that, preferably, the process is operated to yield a residue stream that has a propane content at least about 5% or more, such as 10%, 15% or 20%, greater than the membrane feed stream. In terms of the residue stream composition itself, it is preferred to operate the process to achieve a residue stream propane content of at least about 15% or higher, such as 20%, 25%, 30% or 40%. Most preferably, the residue stream has a propane content higher than about 40%.

In another aspect, the improved balance between controlling propane and losing propylene that is provided by the membrane separation step can be used to provide a lower concentration of propane in the reactor. By selectively retaining propane, the process results in a membrane permeate stream, 112, that is enriched in propylene content compared with stream 109. Since an important goal of the invention is to control or diminish loss of propylene during purging, a very high propylene concentration in the permeate, achieved as discussed above by taking only a very small stage-cut through the membrane, defeats the purpose of the invention. As a result, the propylene concentration in the permeate will typically be only moderately higher than the feed, such as no more than about 15%, 10% or even only about 5% higher. In fact, the membrane permeate stream typically has a propylene concentration that is below 95%, or even below 90%, and is recirculated to the polymerization reactor at comparatively low concentration. Nevertheless, this leads to a slightly higher propylene partial pressure in the reactor, depending on the proportion of the reactor feed represented by the membrane permeate stream.

To exemplify this in a simplified manner for clarity, suppose, as a non-limiting example, that the conversion of propylene to polypropylene in the reactor is about 50% (so that about 50% of the off-gases are recirculated), and that the total reactor feed is made up of one part fresh propylene at 99.5% propylene concentration and one part recirculated propylene at 80% propylene concentration, the average propylene concentration of the reactor feed is 89.75%. A representative membrane separation step might create, from a membrane feed stream having 80% propylene concentration, a permeate stream with a propylene concentration of 88%. The effect that this has on the partial pressure of propylene in the reactor feed depends on how much of the recirculation stream has been treated by the membrane separation step. In the extreme case that all of the recirculated gas of stream 113 is so treated, that is, the split between streams 109 and 108 is in the ratio 100:0, the reactor feed is now one part 99.5% propylene and one part 88% propylene, an average propylene concentration of 93.75%. At the other extreme, if the membrane separation step produces a permeate recycle stream, 112, that represents only 1% of the gas that is recirculated, then the reactor feed is now fifty parts 99.5% propylene (stream 101), forty nine parts 80% propylene (stream 108) and one part 88% propylene (stream 112), an average propylene concentration of 89.83%. Thus, even in this comparatively unattractive case, with low conversion and low recirculation concentration, with the two extremes of this example, the invention provides scope for raising the propylene concentration and lowering the propane concentration in the reactor by between 0.1% and 4%. As stated above, it is preferred that the membrane step treat only a portion of the overhead stream 107 since there is also a balance between the benefits and cost of the membrane treatment step. Even though so doing results in a propylene partial pressure increase that is comparatively small, such as just 1% or 2%, this is very beneficial in improving the rate of reaction and fractional conversion in the reactor. The total productivity of the process is thus increased. This important benefit is illustrated more fully in the Examples below. This issue is also discussed in more detail in co-owned and copending serial number (not yet assigned) entitled "Membrane-Augmented Manufacture of Propylene Derivative" incorporated herein by reference.

Thus, by following the teachings herein, those of skill in the art will now be able to design and execute polypropylene manufacturing processes that are characterized by better conversion per pass, lower propylene loss, or most importantly both better conversion and lower propylene loss together, than was previously accomplished or recognized to be possible by practitioners of the art.

FIG. 1 shows the membrane separation step as a single box, and indeed it is preferred to carry out the membrane separation using a one-stage membrane system. However, if the first permeate stream requires further separation, it may be passed to a second bank of modules for a second-stage treatment. If the second permeate stream requires further purification, it may be passed to a third bank of modules for a third processing step, and so on. Likewise, if the residue stream requires further treatment, it may be passed to a second bank of modules for a second-step treatment, and so on. Such multistage or multistep processes, and variants thereof, will be familiar to those of skill in the art, who will appreciate that the membrane separation step may be configured in many possible ways, including single-stage, multistage, multistep, or more complicated arrays of two or more units in series or cascade arrangements.

With the exception of those that rely on facilitated transport of propylene, the membranes described above as suitable for use in the invention are also very permeable to hydrogen. Thus, when hydrogen is present in the stream 107 overhead gases after crude polymer separation, as is often the case, almost all of this hydrogen will be recovered in the permeate stream 112. This is a farther advantage of the invention, as it reduces the demand of the process for costly fresh hydrogen.

The invention is now illustrated in further detail the following examples, which are intended to further clarify the invention, and are not intended to limit the scope in any way.

GROUP I EXAMPLES

Membrane Performance

Example 1
Pure-Gas Permeation Data

Composite membranes with selective layers of poly (phenylene oxide) [PPO] or one of three grades of 6FDA polyimide were cut into 12.6-cm² stamps and tested in a permeation test-cell apparatus with pure oxygen, nitrogen, propane, and propylene at 25° C. feed temperature and 65 psia feed pressure. The permeate side of the cell was maintained at atmospheric pressure. During each test, the feed, permeate, and residue compositions were analyzed by gas chromatography (GC). The gas fluxes of the membranes were measured, and the selectivities were calculated. Table 1 summarizes the fluxes and selectivities of the composite membranes.

TABLE 1

| Membrane Selective Layer | Pressure-Normalized Flux (GPU) | | | | Selectivity (–) | |
|---|---|---|---|---|---|---|
| | $O_2$ | $N_2$ | $C_3H_6$ | $C_3H_8$ | $O_2/N_2$ | $C_3H_6/C_3H_8$ |
| PPO | 26 | 5.8 | 88.8 | 16.7 | 4.5 | 5.3 |
| 6FDA-ODA | 22 | 3.2 | 40.8 | 6.7 | 6.9 | 6.1 |
| 6FDA-TMPD | 82 | 20 | 433 | 130 | 4.1 | 3.3 |
| 6FDA-NDA | 77 | 16.4 | 50.2 | 4.0 | 4.7 | 13 |

Example 2
Mixed-Gas Permeation Data

The tests of Example 1 were repeated with a 50% propylene/50% propane gas mixture. All other test conditions were as in Example 1. The results are shown in Table 2.

TABLE 2

| Membrane Selective Layer | Pressure-Normalized Flux (GPU) | | Selectivity (–) |
|---|---|---|---|
| | $C_3H_6$ | $C_3H_8$ | $C_3H_6/C_3H_8$ |
| PPO | 34 | 7.1 | 4.8 |
| 6FDA-ODA | 6 | 2.3 | 2.6 |
| 6FDA-TMPD | 210 | 70 | 3.0 |
| 6FDA-NDA | 20 | 3.1 | 6.5 |

Example 3
Mixed-Gas Permeation Data

A composite membrane with a PPO selective layer was rolled into a spiral-wound module, which was tested in a module test apparatus at 25° C. feed temperature and 115 psia feed pressure. The permeate pressure was maintained at 20 psia. The feed was a 50% propylene/50% propane gas mixture. The propylene and propane fluxes were 12 and 4 GPU, respectively, yielding a propylene/propane selectivity of 3.

As can be seen from the results of Examples 1–3, all of the membrane materials tested are suitable for use in the process of the invention.

Example 4
Mixed-Gas Permeation Data

Composite membranes with selective layers of a tetrafluoroethylene/2,2,4-trifluoro-5-trifluorometoxy-1,3-dioxole copolymer [Hyflon® AD60] were cut into 12.6-cm² stamps and tested in a permeation test-cell apparatus at 20–50° C. feed temperature, 165 psia feed pressure and 20 psia permeate pressure with a 60% propylene/40% propane gas mixture. The saturation temperature of this mixture at 165 psia is 27° C. The gas fluxes were measured and the selectivities were calculated at each hour over the 5-hour test period at each temperature.

Fluxes and selectivities showed only minor changes over the test period. For example, at 30° C. feed temperature, the flux increased from 25 GPU to about 50 GPU over the 5-hour test period. The calculated selectivities decreased slightly from about 3.1 to about 2.7.

Example 5
Mixed-Gas Permeation Data

Composite membranes with a Hyflon® AD60 selective layer were rolled into a spiral-wound module, which was tested with a gas mixture comprising approximately 60% propylene and 40% propane at 30° C. at feed pressures ranging from 65 to 165 psia, with the permeate pressure maintained at 20 psia. The gas fluxes were measured and the selectivities were calculated at each pressure.

The propylene flux increased from about 6 GPU at 65 psia, to about 9 GPU at 115 psia, and to about 19 GPU at 165 psia. The propylene/propane selectivities remained essentially constant in the range 3.0 to 3.3 across the range of pressures.

As can be seen from the results of Examples 4–5, Hyflon® AD60 membranes are suitable for use in the process of the invention.

Example 6
Mixed-Gas Permeation Data

Composite membranes with selective layers of the polyimide (3,4,3'4'-biphenyltetracarboxylic dianhydride-2,4,6-m-phenylenediamine) [BPDA-TMPD] were cut into 12.6-cm² stamps and tested according to the same general procedures as in Example 1, with pure oxygen and nitrogen and a gas mixture of 50% propylene/50% propane. The feed temperature was 23° C., the feed pressure was 65 psia, and the permeate pressure was 20 psia. The gas fluxes of the membranes were measured, and the selectivities were calculated. Table 3 summarizes the fluxes and selectivities of the composite membranes.

TABLE 3

| Membrane Sample # | Pressure-Normalized Flux (GPU) | | | | Selectivity (–) | |
|---|---|---|---|---|---|---|
| | $O_2$ | $N_2$ | $C_3H_6$ | $C_3H_8$ | $O_2/N_2$ | $C_3H_6/C_3H_8$ |
| 1 | 27.4 | 7.2 | 45.8 | 24.1 | 3.8 | 1.9 |
| 2 | 18.2 | 3.8 | 14.7 | 5.3 | 4.8 | 2.8 |

Example 7
Mixed-Gas Permeation Data

Composite membranes with a selective layer of BPDA-TMPD were rolled into a spiral-wound module, which was tested with a 60% propylene/40% propane feed gas mixture at 16° C. and 60° C. feed temperatures and 75–95 psia feed pressure, with the permeate pressure maintained at 20 psia. The pressure-normalized gas fluxes were measured. For both gases at the lower temperature, the fluxes increased sharply above 85 psia. Because the increases in the gas fluxes were proportionate, the calculated selectivities remained between about 2.5 to 4 across the pressure range.

As can be seen from the results of Examples 6–7, BPDA-TMPD membranes are suitable for use in the process of the invention.

Example 8
Mixed-Gas Permeation Data

Figure 2:
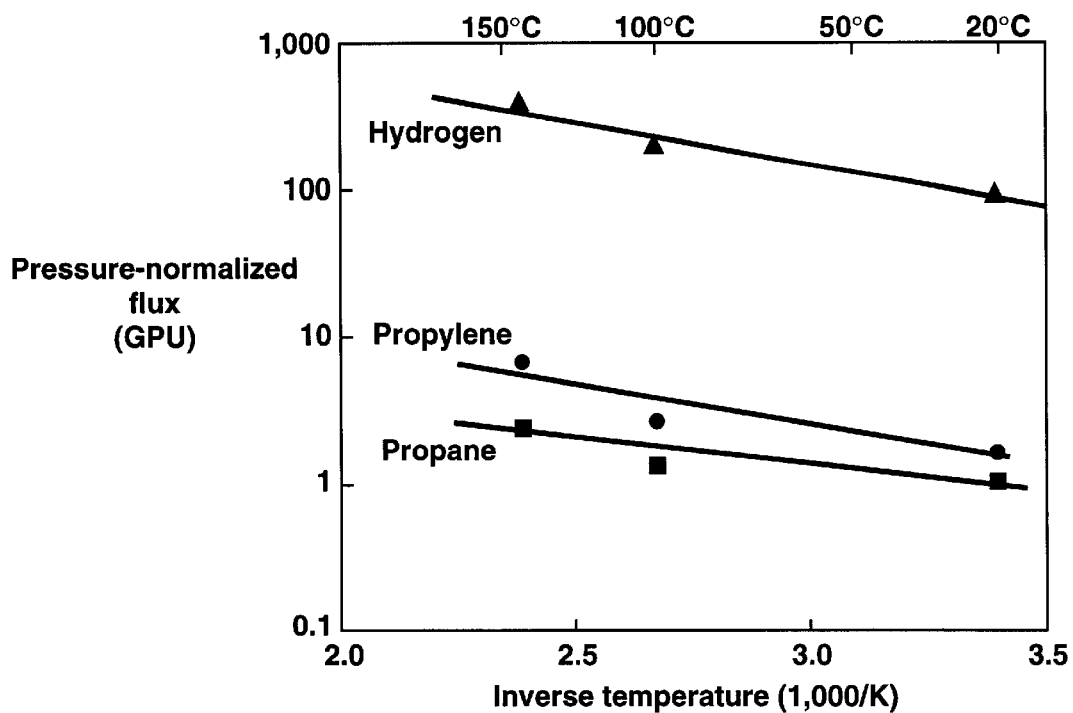
FIG. 2 is graph of mixed-gas pressure-normalized fluxes as a function of temperature with a Hyflon® AD60 membrane.
Figure 3:
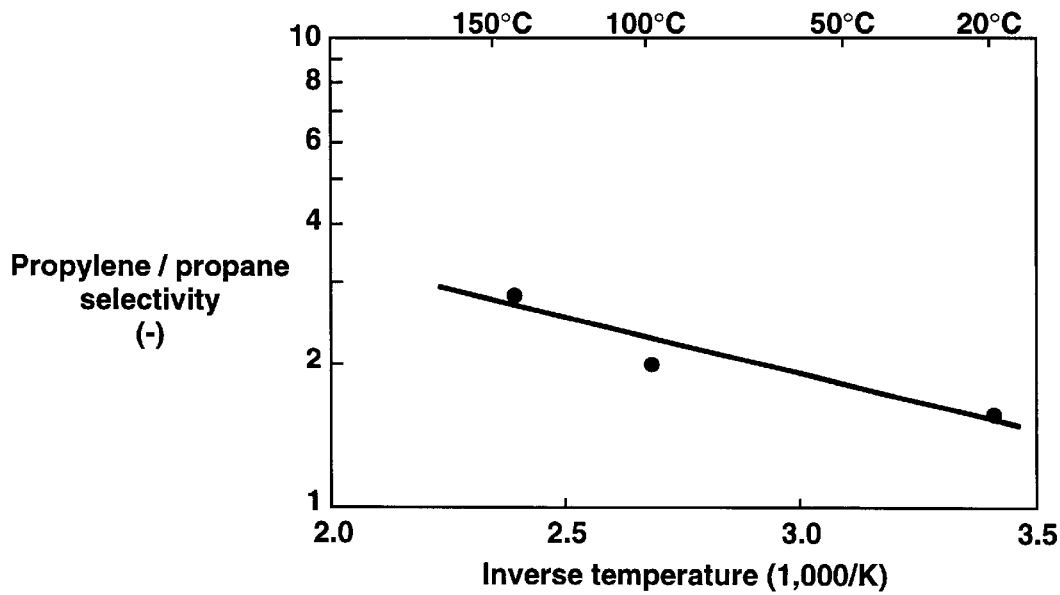
FIG. 3 is graph of mixed-gas selectivity as a function of temperature with a Hyflon® AD60 membrane.

A composite membrane with a selective layer of Hyflon® AD60 was cut into stamps and tested with a gas mixture of 80% hydrogen/15% propane/5% propylene. The feed pressure was 80 psia, and the feed temperature was varied from 20° C. to 170° C. The pressure-normalized gas fluxes were measured, and the selectivities calculated. The results are presented in FIGS. 2 and 3, graphs of the gas fluxes and the propylene/propane selectivity, respectively, as a function of feed temperature.

Example 9
Mixed-Gas Permeation Data

Figure 4:
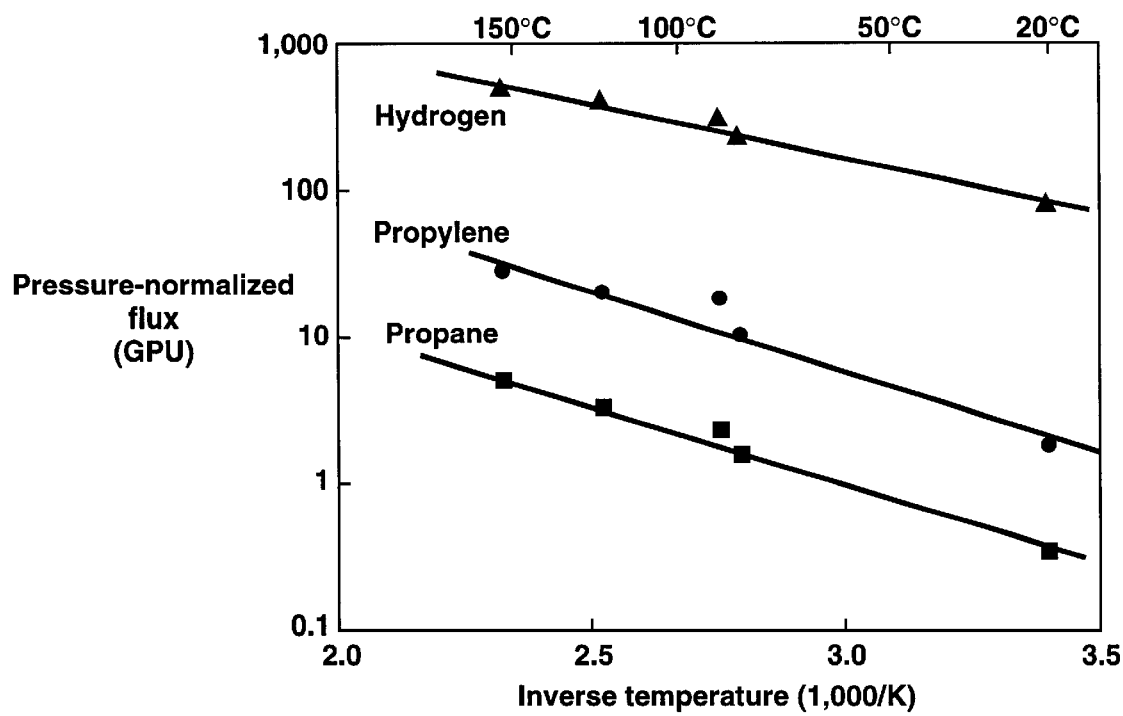
FIG. 4 is graph of mixed-gas pressure-normalized fluxes as a function of temperature with a BPDA-TMPD polyimide membrane.
Figure 5:
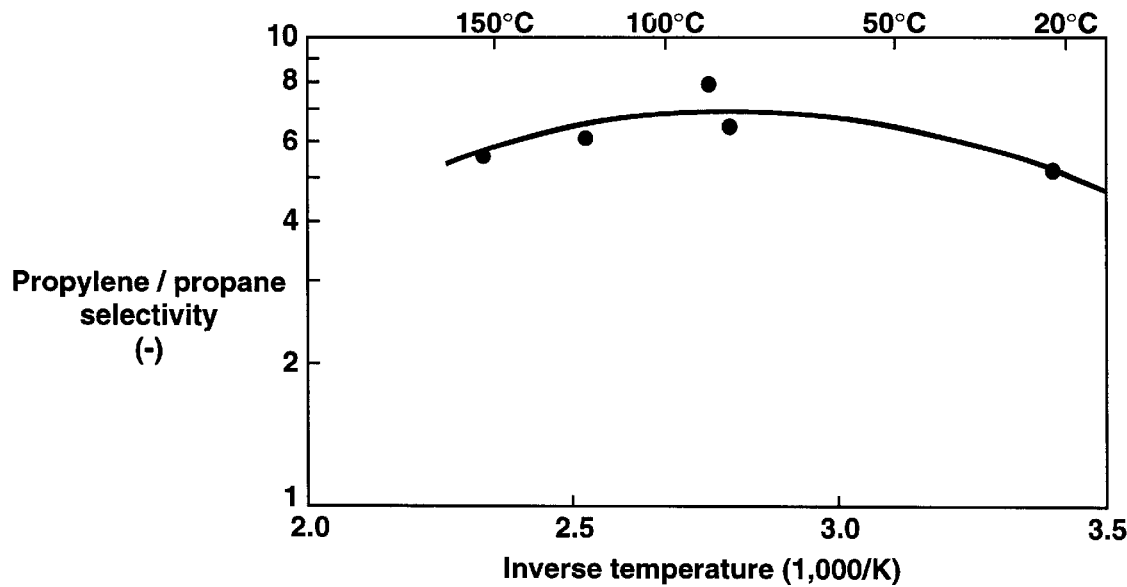
FIG. 5 is graph of mixed-gas selectivity as a function of temperature with a BPDA-TMPD polyimide membrane.

The experiment of Example 8 was repeated with a composite membrane with a selective layer of BPDA-TMPD. All experimental conditions were as in Example 8. The results are presented in FIGS. 4 and 5, graphs of the gas fluxes and the propylene/propane selectivity, respectively, as a function of feed temperature.

Example 10
Mixed-Gas Permeation Data

A solid polymer electrolyte membrane with a selective layer of poly(ethylene oxide)/silver tetrafluoroborate prepared as described in U.S. Pat. No. 5,670,051 was tested with a gas mixture of 50% propylene/50% propane. The feed temperature was 23° C. and the feed pressures were 35, 50, and 65 psia. The permeate pressure was about 15 psia. The gas fluxes of the membranes were measured, and the selectivities calculated. Table 4 summarizes the fluxes and selectivities of the membrane.

TABLE 4

| Feed Pressure | Pressure-Normalized Flux (GPU) | | Selectivity (–) |
|---|---|---|---|
| (psia) | $C_3H_6$ | $C_3H_8$ | $C_3H_6/C_3H_8$ |
| 35 | 56 | 1.0 | 56 |
| 50 | 39 | 0.8 | 51 |
| 65 | 49 | 1.1 | 45 |

As can be seen, solid polymer electrolyte membranes of this type are suitable for use in the process of the invention.

GROUP II EXAMPLES

Polypropylene Manufacturing Calculations

Example 11

Not in Accordance with the Invention

Figure 6:
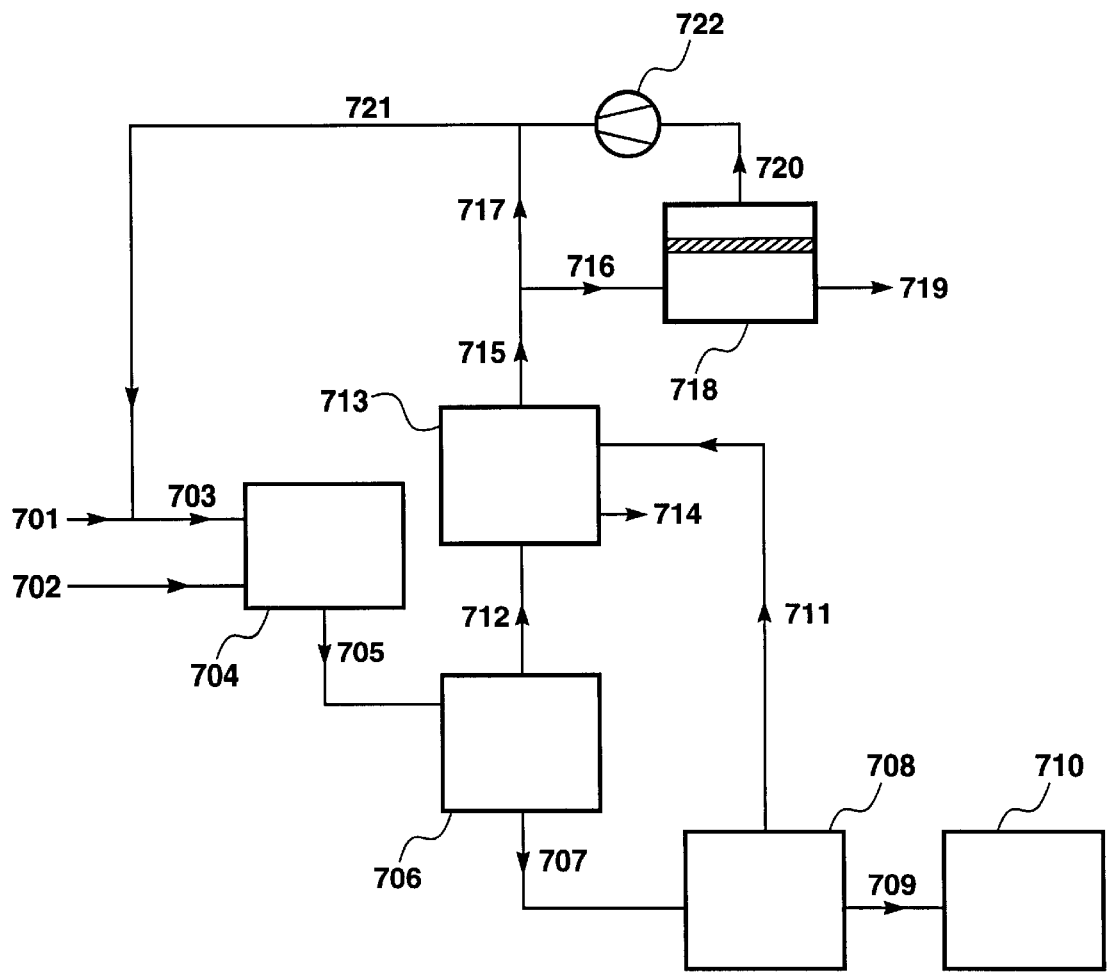
FIG. 6 is a schematic drawing showing an embodiment of the invention as might be used in a liquid-phase polypropylene manufacturing process.

A computer calculation was performed to illustrate the monomer losses that occur in a typical prior art liquid-phase polypropylene manufacturing plant. The process was assumed to be carried out as shown in FIG. 6, but without the membrane separation unit. Polymer-grade propylene feedstock, stream 701 containing 99+% propylene, is mixed with recycle stream 721, containing unreacted propylene, propane, and hydrogen, to form feed stream 703 to reactor 704. Stream 702 represents all the other components introduced into the reactor together or individually, and was assumed to contain hexane solvent, catalysts, polymerization agents and hydrogen. The hydrogen is introduced as an inert diluent to control the polymerization within desired parameters.

The reactor effluent, stream 705, is passed to a separation step or series of steps, 706. These steps lower the pressure on the effluent stream, so that light components of the stream, including unreacted propylene and hydrogen, are flashed off as stream 712. The raw product stream, 707, is passed to monomer recovery unit 708, to remove additional propylene as stream 711. Crude polypropylene, stream 709, is passed to downstream finishing steps, 710, to produce the final polypropylene product. Overhead gas stream 712 from the separation step and propylene stream 711, are fed to a propylene recovery column, 713, to remove hexane and other heavy ends, stream 714. A portion of the recovered propylene stream, 715, is purged as stream 716 to remove propane from the recycle loop. The remainder of the recovered propylene is recycled back to the reactor as stream 717 and 721, to be mixed with the propylene feedstock to form reactor feed 703.

The results of the calculations are summarized in Table 5.

TABLE 5

| Stream | 701 | 702 | 705 | 712 | 707 | 711 | 716 | 714 | 717 | 709 |
|---|---|---|---|---|---|---|---|---|---|---|
| Mass Flow (lb/h) | 23,607 | 95 | 52,970 | 27,864 | 25,106 | 2,386 | 752 | 226 | 29,272 | 23,340 |
| Component (lb/h) | | | | | | | | | | |
| Propylene | 23,371 | | 20,970 | 19,388 | 1,582 | 1,582 | 525 | 21 | 20,424 | |
| Propane | 236 | | 9,075 | 8,390 | 685 | 685 | 227 | 9 | 8,839 | |
| Hexane | | | 51 | 51 | 47 | 4 | 4 | 51 | | |
| Hydrogen | | 8 | 9 | 8 | 1 | 1 | | | 9 | |
| Nitrogen | | | | | | | | | | 620 |

TABLE 5-continued

| Stream | 701 | 702 | 705 | 712 | 707 | 711 | 716 | 714 | 717 | 709 |
|---|---|---|---|---|---|---|---|---|---|---|
| Catalysts/Agents | | 36 | 36 | 31 | 5 | | | 31 | | 5 |
| Heavy Ends | | | 114 | | 114 | 114 | | 114 | | |
| Polymer | | | 22,715 | | 22,715 | | | | | 22,715 |

The propylene feedstock, stream 701 contains about 1% propane, which is removed from the process loop as vent stream 716 and with fuel stream 714. As can be seen, for every lb/h of propane removed from each of these streams, more than twice as many lb/h of propylene are also removed, and thus lost from the process loop. Stream 716 also contains hydrogen, which is added to the reactor as an inert diluent to control the polymerization. Since this hydrogen is removed with the vent stream, it must be continuously replaced as part of stream 702.

Example 12
Olefin/Paraffin Separation

A computer calculation was performed with a modeling program, ChemCad V (ChemStations, Inc., Houston, Tex.), to illustrate just the performance of a membrane separation step, such as step 718 of FIG. 6. For the purposes of this calculation, it was assumed for simplicity that membrane feed stream 716 contains 80% propylene and 20% propane only. The membrane unit was assumed to contain polymeric membranes as described in the detailed description of the invention. The membrane separation step produces propylene-depleted residue stream 719 for venting from the process and propylene-enriched permeate stream 720 for recirculation to the reactor after recompression in compressor 722. Stream 716 was assumed to be at 150 psia and 50° C. The results of the calculations are summarized in Table 6. Stream numbers refer to FIG. 6.

TABLE 6

| Stream | 716 | 719 | 720 |
|---|---|---|---|
| Mass Flow (lb/h) | 372 | 54 | 318 |
| Pressure (psia) | 150 | 150 | 15 |
| Temperature (° C.) | 50 | 48 | 49 |
| Component (lb/h) | | | |
| Propane | 77 | 31 | 47 |
| Propylene | 295 | 23 | 271 |
| Component (mol %): | | | |
| Propane | 20.0 | 55.6 | 14.1 |
| Propylene | 80.0 | 44.4 | 85.9 |

Membrane area=260 m$^2$

As can be seen, the membrane separation step can reduce the propylene content of the gas to be vented from 80% to below 50%.

Examples 13–14

Two calculations were performed to compare the process of the invention with a prior art polypropylene manufacturing process in terms of the propylene concentration that can be maintained in the reactor when the process is run with propylene recycle.

Example 13
Not in Accordance with the Invention

A computer calculation was performed to model a polypropylene manufacturing process according to the prior art. The process design as depicted in FIG. 7, without the membrane treatment step, and as described above in Example 11 was assumed to be used.

The process was assumed to use a polymer-grade propylene feedstock of 99.5% purity, and the propylene conversion per pass was assumed to be 50%. The calculation was run to reach an equilibrium situation in terms of the gas vented from the process as stream 716 and the composition of the reactor feed stream 703 including the recirculated gas. The calculated characteristics of these streams are given in Table 7.

Example 14
According to the Process of the Invention

Figure 7:
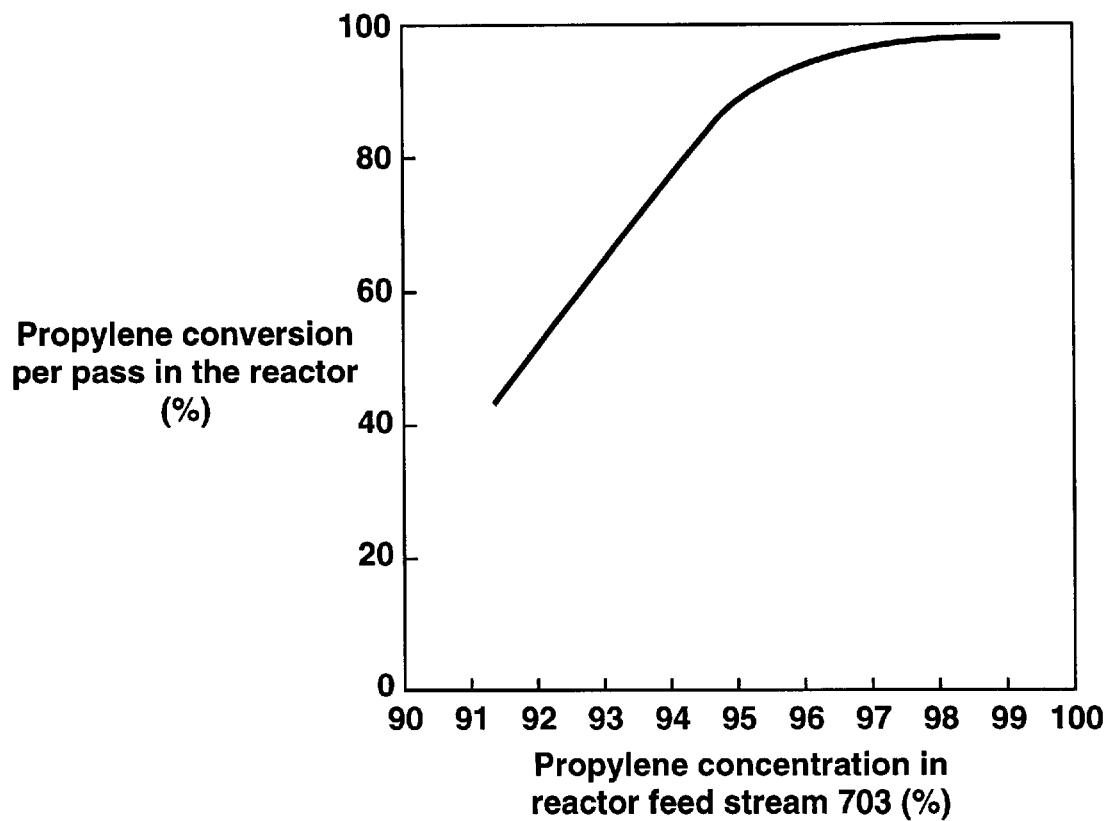
FIG. 7 is a graph of propylene conversion per pass in a reactor as a function of propylene concentration in the reactor feed.

The calculation of Example 13 was repeated, again according to the design of FIG. 7, this time including the membrane separation step. As shown in FIG. 7, stream 716 was assumed to be treated in membrane separation step 718, to yield propylene-enriched permeate stream, 720, for recirculation to the reactor feed, and propane-enriched residue stream, 719, for venting from the process.

The calculation parameters were adjusted so that the amount of propylene and propane vented from the loop as residue stream 719 was the same as that vented as stream 716 in "no-membrane" Example 13, that is, a propylene loss of about 11 lbmol/h and a propane loss of about 5.9 lbmol/h. The conversion per pass was increased from 50% to 90%.

The results of the calculations are shown in Table 7.

TABLE 7

| Stream | Reactor feed stream 703 | Vent stream 716 (Ex.13) 719(Ex.14) |
|---|---|---|
| Flow rate (lbmol/h) | | |
| Propylene | | 11.1 |
| Propane | | 5.9 |
| EXAMPLE 13 No membrane case | | |
| Component (mol%) | | Stream 716 |
| Propylene | 78.9 | 65.2 |
| Propane | 21.1 | 34.8 |
| EXAMPLE 14 Membrane case | | |
| Component (mol%) | | Stream 719 |
| Propylene | 95.1 | 64.9 |
| Propane | 4.9 | 35.1 |

As can be seen from the table, the effect of including the membrane separation step, but maintaining the same vent gas flow rate and composition as in the prior art case of Example 13, is to increase the propylene concentration of the reactor feed gas from 79% to 95%. With this high concentration in the feedstock, the conversion of propylene to polypropylene per pass will increase from 50% to 90%. In a real process, this would result in substantially increased polymer production per unit reactor capacity.

Thus, for the same propane purge and propylene loss as in the no-membrane example, the process of the invention provides an increase in propylene concentration to the reactor, which in turn increases the propylene conversion rate and improves polypropylene productivity.

Examples 15–16

Two calculations were performed to compare the process of the invention with a prior art polypropylene manufacturing process in terms of the propylene lost in the vent stream.

Example 15
Not in Accordance with the Invention

A computer calculation as in Example 13 was performed to model a polypropylene manufacturing process according to the prior art. The process design as depicted in FIG. 7, as described in Example 13 and without the membrane separation step, was assumed to be used.

The process was assumed to use a polymer-grade propylene feedstock of 99.5% purity, and the propylene conversion per pass was assumed to be 90%. The calculation parameters were adjusted to maintain a very high propylene concentration in the reactor. The calculation was run to reach an equilibrium situation in terms of the gas vented from the process as stream 716 and the a composition of the reactor feed stream 703 including the recirculated gas. The calculated characteristics of these streams are given in Table 8. As can be seen, to maintain a reactor feed stream concentration of close to 99% required venting over 50 lbmol/h of propylene. For every lbmol of propane vented, nearly 9 lbmol of propylene are lost.

Example 16
According to the Process of the Invention

The calculation of Example 15 was repeated, again according to the design of FIG. 7, this time including the membrane separation step. As shown in FIG. 7, stream 716 was assumed to be treated in membrane separation step 718, to yield propylene-enriched permeate stream, 720, for recirculation to the reactor feed, and propane-enriched residue stream, 719, for venting from the process.

The calculation parameters were adjusted so as to maintain a 98.8% concentration of propylene in reactor feed stream 703, as in the "no-membrane" Example 15, and to vent 5.9 lbmol/h of propane as in Examples 13, 14 and 15.

The results of the calculations are shown in Table 8.

TABLE 8

| Stream | Reactor feed stream 703 | Vent stream 716 (Ex. 15) 719 (Ex. 16) | Permeate stream 720 (Ex.16) |
|---|---|---|---|
| Component (mol%) | | | |
| Propylene | 98.8 | | 95.2 |
| Propane | 1.2 | | 4.8 |
| EXAMPLE 15 No membrane case | | | |
| Flow rate (lbmol/h) | | Stream 716 | |
| Propylene | | 50.3 | |
| Propane | | 5.9 | |
| EXAMPLE 16 Membrane case | | | |
| Flow rate (lbmol/h) | | Stream 719 | |
| Propylene | | 34.5 | 29.5 |
| Propane | | 5.9 | 1.5 |

As can be seen from the table, the effect of including the membrane separation step, but maintaining the same high reactor feed composition as in the prior art case of Example 15, is to decrease the propylene loss with the propane vent stream from 50 lbmol/h to only 34 lbmol/lh, a decrease of 34%.

By comparing all four Examples 13–16, it may be seen that all succeed in venting the same amount of propane, 5.9 lbmol/lh, from the reactor loop. With the process of the invention however, there is flexibility to improve over the prior art by raising the productivity of the reactor, as in Example 14, or substantially reducing the propylene loss, as in Example 16.

It will be apparent from the above to those of skill in the art that, in a real process, the benefits of (a) higher reactor productivity or (b) lower feedstock loss are not exclusive one of the other. In other words, the overall benefit may be balanced as desired to achieve the optimum performance/cost combination for any specific set of circumstances.

Example 17

Operational data on the relationship between propylene concentration in the reactor feed and propylene-to-polypropylene conversion per pass in the reactor were used to construct the graph of FIG. 7.

As can be seen, the slope of the graph is steepest in the region where the reactor feed propylene concentration is below 95%. Thus, if the process of the invention is used in this range to increase the total reactor feed concentration by only 1% or 2%, for example, compared with a prior art process (in which the recirculated gas is not treated by membrane separation), the result is a very advantageous increase in conversion per pass, which in turn results in overall increased productivity.

We claim:

1. A process for making polypropylene, comprising the steps of:

(a) polymerizing propylene in a polymerization reactor, (b) withdrawing from the reactor an effluent comprising polypropylene, propylene and propane;

(c) subjecting the effluent to at least one separation step, thereby producing a raw polymer stream and a gas stream;

(d) passing at least a portion of the gas stream across a feed side of a membrane selective for propylene over propane;

(e) withdrawing from a permeate side of the membrane a permeate stream enriched in propylene compared to the gas stream;

(f) withdrawing from the feed side a residue stream enriched in propane compared to the gas stream, and having a propane concentration of at least about 30%;

(g) recirculating at least a portion of the permeate stream as feed to the polymerization reactor; the process being characterized in that the type of membrane used to carry out step (d) excludes facilitated transport membranes with liquid carriers.

2. The process of claim 1, wherein the permeate stream has a propylene concentration that is lower than 95%.

3. The process of claim 1, wherein step (a) is carried out in the liquid phase.

4. The process of claim 1, wherein step (a) is carried out in the gas phase.

5. The process of claim 1, wherein the separation step comprises flash evaporation.

6. The process of claim 1, wherein the separation step comprises cooling and condensation.

7. The process of claim 1, wherein the separation step comprises distillation.

8. The process of claim 1, wherein the membrane is a polymeric membrane.

9. The process of claim 1, wherein the membrane is an inorganic membrane.

10. The process of claim 1, wherein the membrane is a solid polymer electrolyte membrane.

11. The process of claim 8, wherein the polymeric membrane comprises a polyimide selective layer.

12. The process of claim 8, wherein the polymeric membrane comprises a poly(phenylene oxide) selective layer.

13. The process of claim 8, wherein the polymeric membrane comprises a selective layer comprising perfluorinated dioxole, a perfluorinated dioxolane or a perfluorinated cyclic ether.

14. The process of claim 1, wherein the membrane exhibits a selectivity for propylene over propane, when in use in the process, of at least about 2.

15. The process of claim 1, wherein the membrane exhibits a selectivity for propylene over propane, when in use in the process, of at least about 3.

16. The process of claim 1, wherein the gas stream further comprises hydrogen.

17. A process for making polypropylene, comprising the steps of:

(a) polymerizing propylene in a polymerization reactor, (b) withdrawing from the reactor an effluent comprising polypropylene, propylene and propane;

(c) subjecting the effluent to at least one separation step, thereby producing a raw polymer stream and a gas stream;

(d) passing at least a portion of the gas stream across a feed side of a membrane selective for propylene over propane;

(e) withdrawing from a permeate side of the membrane a permeate stream enriched in propylene by no more than about 10% compared to the gas stream;

(f) withdrawing from the feed side a residue stream enriched in propane compared to the gas stream;

(g) recirculating at least a portion of the permeate stream as feed to the polymerization reactor; the process being characterized in that the permeate stream has a propylene concentration that is lower than 95%.

18. The process of claim 17, wherein step (a) is carried out in the liquid phase.

19. The process of claim 17, wherein step (a) is carried out in the gas phase.

20. The process of claim 17, wherein the membrane is a polymeric membrane.

21. The process of claim 17, wherein the membrane is an inorganic membrane.

22. The process of claim 17, wherein the membrane is a solid polymer electrolyte membrane.

23. The process of claim 17, wherein the membrane exhibits a selectivity for propylene over propane, when in use in the process, of at least about 3.

24. The process of claim 17, wherein the gas stream further comprises hydrogen.

25. A process for making polypropylene, comprising the steps of:

(a) polymerizing propylene in a polymerization reactor;

(b) withdrawing from the reactor an effluent comprising polypropylene, propylene and propane;

(c) subjecting the effluent to at least one separation step, thereby producing a raw polymer stream and a gas stream;

(d) passing at least a portion of the gas stream across a feed side of a membrane selective for propylene over propane, the membrane being selected from the group consisting of inorganic membranes, solid polymer electrolyte membranes, perfluorinated dioxole polymer membranes, perfluorinated dioxolane polymer membranes and perfluorinated cyclic ether polymer membranes;

(e) withdrawing from a permeate side of the membrane a permeate stream enriched in propylene compared to the gas stream;

(f) withdrawing from the feed side a residue stream enriched in propane compared to the gas stream;

(g) recirculating at least a portion of the permeate stream as feed to the polymerization reactor; the process being characterized in that the permeate stream has a propylene concentration that is lower than 95%.

26. A process for making polypropylene, comprising the steps of:

(a) polymerizing propylene in a polymerization reactor;

(b) withdrawing from the reactor an effluent comprising polypropylene, propylene and propane;

(c) subjecting the effluent to at least one separation step, thereby producing a raw polymer stream and a gas stream;

(d) passing at least a portion of the gas stream across a feed side of a membrane selective for propylene over propane;

(e) withdrawing from a permeate side of the membrane a permeate stream enriched in propylene compared to the gas stream;

(f) withdrawing from the feed side a residue stream enriched in propane by at least about 10% compared with the gas stream;

(g) recirculating at least a portion of the permeate stream as feed to the polymerization reactor; the process being characterized in that the type of membrane used to carry out step (d) excludes facilitated transport membranes with liquid carriers.

27. The process of claim 26, wherein step (a) is carried out in the liquid phase.

28. The process of claim 26, wherein step (a) is carried out in the gas phase.

29. The process of claim 26, wherein the membrane is a polymeric membrane.

30. The process of claim 26, wherein the membrane is an inorganic membrane.

31. The process of claim 26, wherein the membrane is a solid polymer electrolyte membrane.

32. The process of claim 26, wherein the membrane exhibits a selectivity for propylene over propane, when in use in the process, of at least about 3.

33. The process of claim 26, wherein the gas stream further comprises hydrogen.

* * * * *